June 3, 1969   J. O. STEINKAMP   3,447,708
TRACTOR MOUNTED LOADER
Filed May 15, 1967   Sheet 1 of 2

INVENTOR
JOHN O. STEINKAMP
BY
P. F. Hilder
ATTORNEY

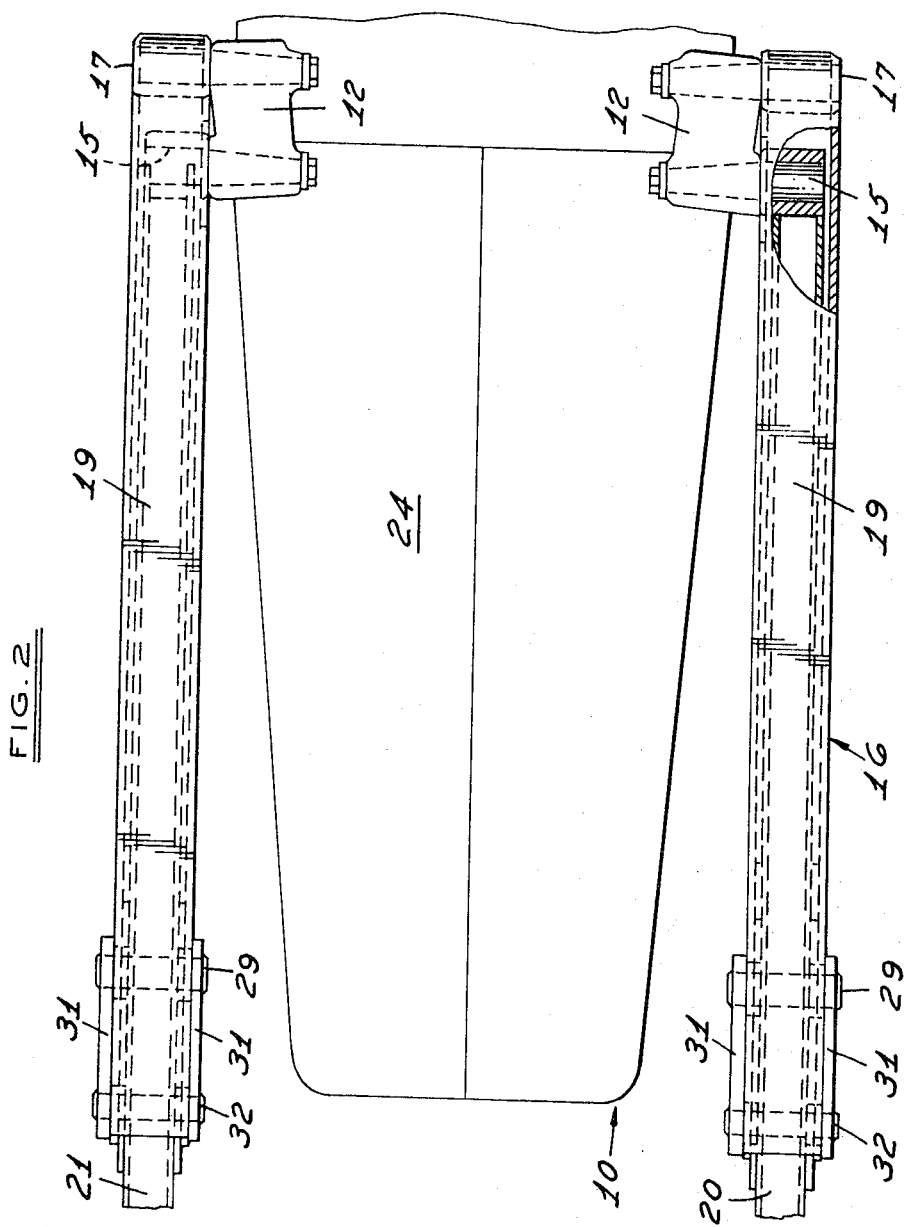

United States Patent Office 3,447,708
Patented June 3, 1969

3,447,708
TRACTOR MOUNTED LOADER
John O. Steinkamp, Troy, Mich., assignor to Ford Motor Company, Dearborn, Mich., a corporation of Delaware
Filed May 15, 1967, Ser. No. 638,435
Int. Cl. E02f 3/70
U.S. Cl. 214—775   1 Claim

ABSTRACT OF THE DISCLOSURE

A mechanical linkage compensates for increased bucket tilt upon raising a tractor mounted loader. The compensating linkage lies along the loader boom and utilizes pivots provided for mounting the lift and bucket cylinders.

---

This invention relates to tractor mounted loaders.

Hydraulically operated loaders often are mounted on the front ends of tractors for scooping up, transporting and loading in a truck dirt or other loose material. These loaders comprise a forwardly opening bucket extending transversely in front of the tractor and mounted for tilting movement on a transverse horizontal axis on the forward end of a boom. The boom is mounted for vertical swinging movement on a transverse axis adjacent the midzone of the tractor and is lifted by hydraulic cylinders to raise the bucket. The boom usually consists of a pair of longitudinal members interconnected by one or more cross members.

A second pair of hydraulic cylinders tilt the bucket so that initially it can be positioned with its bottom wall parallel to the ground. The tractor is driven forwardly to force the bucket into a pile of material, and the bucket is then tilted to retain the material while it is being transported.

As the bucket is raised, the tilt of the bucket tends to increase and, if uncorrected, might dump material over the top edge of the bucket and down onto the tractor and operator. To correct this tendency, a compensating linkage is provided to support the bucket tilt cylinders. As the boom is raised, this linkage lowers the bucket cylinders to partially compensate for increased bucket angle due to raising of the boom. In the form shown, the compensating linkage requires only one additional pivot on each side of the loader, and the compensating link is positioned about the boom so as not to adversely affect operator visibility.

Among the objects of the present invention are to provide an improved tractor mounted loader construction utilizing a compensating linkage to reduce the tilt of the bucket when arising the loader; to provide such a construction in which visibility by the tractor operator is not substantially impaired; to provide such a construction having a minimum number of pivots for the compensating linkage; and generally to improve constructions of the type described.

Other objects and objects relating to details of construction will be apparent from the detailed description to follow.

FIGURE 2 is a top plan view of the hoirzontal portion of the loader boom and associated parts of the tractor, attachment of the compensating linkage to the tractor being shown. A portion of the compensating linkage is broken away to show details of the pivotal mounting of the loader boom to the tractor.

FIGURE 3 is a cross section of the loader boom and compensating linkage, taken generally on the line 3—3 of FIGURE 1.

Figure 1:
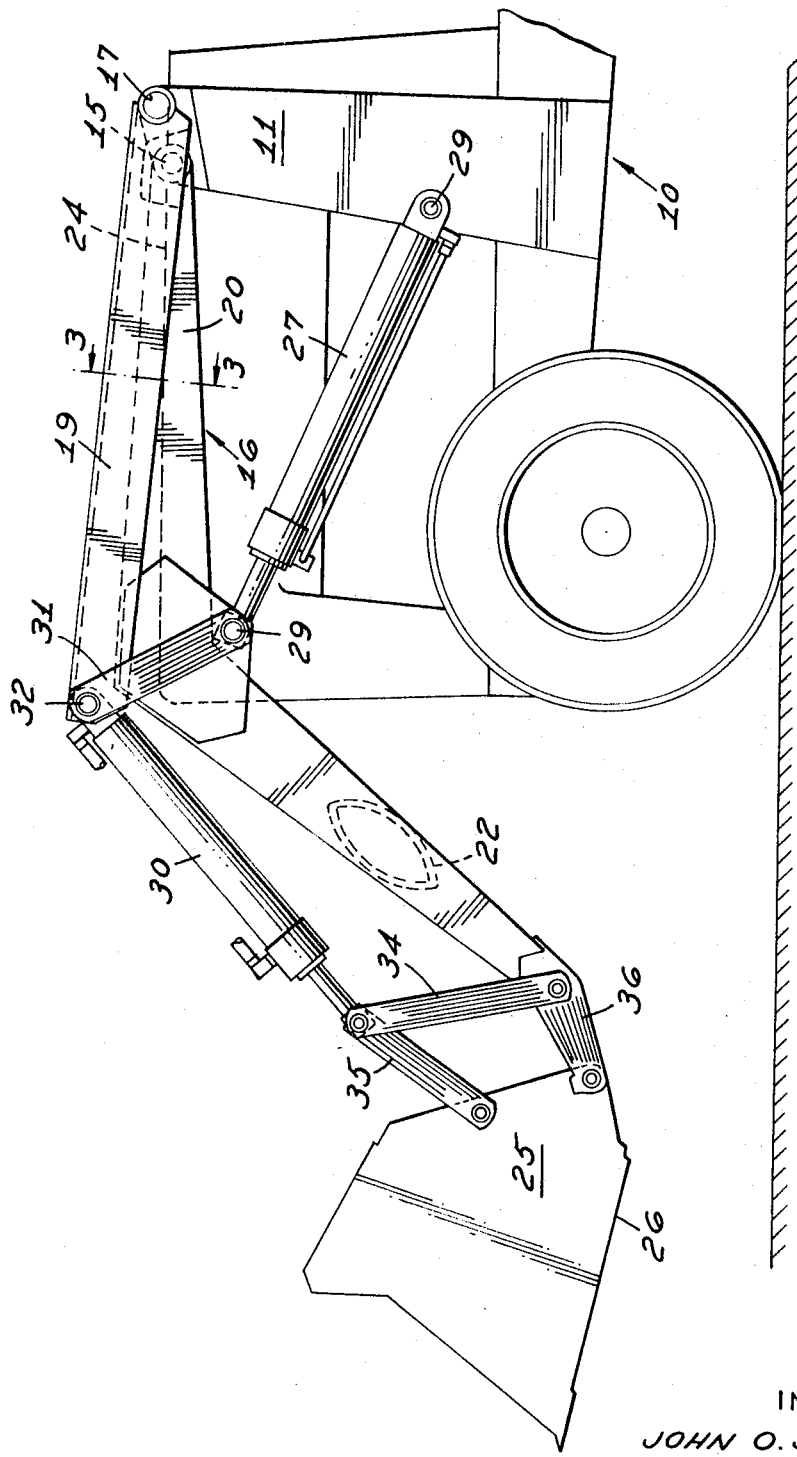
FIGURE 1 is a side elevation of a tractor and loader according to the present invention, portions of the tractor and loader being broken away for convenience of illustration.

Referring now to the drawings, the tractor 10 upon which the loader of the present invention is shown mounted is preferably of the industrial type, specifically adapted for mounting a front mounted loader. The tractor has a heavy frame structure including uprights 11 located one on each side of the tractor in the mid-portion of the tractor and a short distance in front of the operator's position. The top of each upright is provided with a casting 12 receiving horizontally extending pins to provide a pair of horizontal, transverse axes, one pair of pins 15 supporting a loader boom 16 for vertical swinging movement, and the other pair of pins 17 being located slightly to the rear and slightly above the pins 15 for receiving the rear ends of compensating links 19 (to be explained in more detail later).

The boom 16 comprises a rigid frame including a pair of spaced, generally parallel longitudinal members 20 and 21 which, when lowered, extend forwardly from the axis 15 and then downwardly at an angle to the ground, the longitudinal members generally having the shape shown in FIGURE 1. The longitudinal members are interconnected by at least one cross member 22. Each longitudinal members is located laterally beyond the hood 24 of the tractor so that upon lowering the boom 16, the members 20 and 21 extend one on each side of the tractor hood.

A bucket 25 is pivotally mounted for vertical tilting movement on the forward ends of the boom members 20 and 21 and extends transversely in front of the tractor. The bucket 25 is forwardly opening and may be positioned for loading by lowering the boom and bucket and rotating the bucket so that the bottom wall 26 thereof is parallel to and rides along the surface of the ground. Then, by driving the tractor forwardly, the bucket can be driven into a pile of loose material in a well-known manner to force the material into the bucket, after which the bucket is tilted somewhat to retain the material.

The loader boom 16 is raised by vertical swinging movement about the axis 15. This is accomplished by a pair of hydraulic lift cylinders 27 extending between the uprights 11 of the tractor and the boom adjacent the intersection of the forwardly and downwardly extending portions thereof. Pins 29 pivotally connect the ends of the lift cylinders 27 to the uprights 11 and to the boom.

The bucket cylinders 30 are mounted one in front of the downwardly extending portions of each of the longitudinal members 20 and 21. The rear tends of the cylinders are pivotally supported from the boom longitudinal members by links 31 which are pivotally mounted on the boom by the pins 29 mounting the lift cylinders 27. Pins 32 connect the upper ends of these links to the bucket cylinders 30.

The lower ends of the bucket cylinders 30 are connected to the bucket 25 by a 4-bar linkage including the links 34 and 35. The lower end portion 36 of each boom side member and a portion of the bucket 25 form the other two members of the 4-bar bucket operating linkage. This bucket operating linkage gives a greater range of swing of the bucket 25 on the boom and provides a more uniform ratio of bucket swing to cylinder extension throughout the range of swing of the bucket.

Compensating linkage for compensating in part for bucket tilt when raising the boom includes the members 19 extending between the pins 32 and the pins 17 mounted on the uprights 11. The compensating link members 19 preferably are of inverted U-shaped cross section and fit about the upper portion of the boom longitudinal members 20 and 21. The inner flanges of these link members may be cut away adjacent the rear inside ends to provide necessary clearance for the pins 15 supporting the boom.

In operation, the bucket 27 is rotated by driving into a pile of material as already described. The bucket is then tilted by retraction of the bucket cylinders 30, thus tilting the bucket clockwise as viewed in FIGURE 1. The bucket is then lifted by extension of the lift cylinders 27. In raising the boom, it may move through an angle of as much as 60 degrees, which would result in a corresponding increase in bucket angle. Due, however, to the compensating linkage supporting the bucket cylinders 30, as the boom is lifted, the links 19 rotate the links 31 counterclockwise as viewed in FIGURE 1 to lower the bucket cylinders 30 and move the bucket counterclockwise. The compensating linkage shown has the ability to rotate the bucket about 40 degrees in the complete range of lift, thus counteracting the increased tilt of the bucket which otherwise would be caused by raising the boom and reducing the increased angle of the bucket upon lifting to a total of about 20 degrees. This makes it unnecessary for the operator to operate the bucket cylinders 30 to reduce bucket angle, and reduces the angle through which the bucket must be rotated to dump the material from the bucket.

The compensating linkage for the bucket requires only one additional pin for each boom side member over that which would be required if the compensating linkage were omitted. In addition, the design of the present invention maintains the compensating link 19 in close overlapping relation to each boom longitudinal member and does not substantially interfere with visibility by the operator.

I claim:

1. In a tractor and front mounted loader, a vertically swingable boom, means on the tractor providing a horizontal transverse axis at the midportion of the tractor for swingably supporting the boom, the boom having a pair of spaced, longitudinal members located one on each side of the tractor and extending forwardly from the axis and then downwardly, a bucket extending transversely in front of the tractor and pivotally mounted on the forward ends of the boom members for vertical tilting movement, a pair of hydraulic lift cylinders supported by the tractor and pivotally connected one to each boom member adjacent the intersection of the forwardly and downwardly extending portions, a vertically swinging link mounted on each boom member adjacent the attachment of the lift cylinders, a pair of bucket tilt cylinders connected between the bucket and the free ends of the swinging links, and a compensating link pivotally mounted on a horizontal axis on the tractor adjacent the boom axis and having an inverted channel form closely overlying the top and both sides of the upper portion of the horizontal section of each boom member and pivotally connected to the free ends of the swinging links, whereby, upon lifting the boom, the bucket is tilted forwardly relative to the boom to reduce rearward bucket tilt.

References Cited

UNITED STATES PATENTS 2,807,379   9/1957   Pilch _____ 214—776 X

FOREIGN PATENTS 883,952   12/1961   Great Britain.

HUGO O. SCHULZ, *Primary Examiner.*